US012152501B2

(12) United States Patent
Perez Reisler et al.

(10) Patent No.: US 12,152,501 B2
(45) Date of Patent: Nov. 26, 2024

(54) PLATFORM OUTSIDE DIAMETER CHANNEL FOR DUAL SUPPLY PRESSURE VANE APPLICATIONS

(71) Applicant: Raytheon Technologies Corporation, Farmington, CT (US)

(72) Inventors: Rafael A. Perez Reisler, Arecibo, OR (US); Efrain Vega Rios, Manati, OR (US); Andres Diaz Alvarado, Humacao, OR (US)

(73) Assignee: RTX Corporation, Farmington, CT (US)

(*) Notice: Subject to any disclaimer, the term of this patent is extended or adjusted under 35 U.S.C. 154(b) by 65 days.

(21) Appl. No.: 17/958,690

(22) Filed: Oct. 3, 2022

(65) Prior Publication Data

US 2024/0110485 A1 Apr. 4, 2024

(51) Int. Cl.

| | |
|---|---|
| ***F01D 5/18*** | (2006.01) |
| ***F01D 9/04*** | (2006.01) |
| ***F01D 9/06*** | (2006.01) |

(52) U.S. Cl.

CPC ............. *F01D 5/187* (2013.01); *F01D 9/041* (2013.01); *F01D 9/06* (2013.01); *F05D 2240/121* (2013.01); *F05D 2240/122* (2013.01); *F05D 2240/81* (2013.01); *F05D 2260/232* (2013.01)

(58) Field of Classification Search

CPC . F01D 5/187; F01D 9/06; F01D 9/065; F05D 2240/81

See application file for complete search history.

(56) References Cited

U.S. PATENT DOCUMENTS

| | | | | |
|---|---|---|---|---|
| 5,320,485 | A * | 6/1994 | Bourguignon | F01D 5/187 415/115 |
| 9,151,164 | B2 | 10/2015 | Tardif et al. | |
| 9,222,364 | B2 * | 12/2015 | Papple | F01D 25/12 |
| 10,502,075 | B2 * | 12/2019 | Papple | F01D 25/12 |
| 11,021,966 | B2 | 6/2021 | Madonna et al. | |
| 2013/0251508 | A1 * | 9/2013 | Tardif | F01D 5/187 415/115 |
| 2014/0047843 | A1 * | 2/2014 | Papple | F01D 9/023 60/726 |
| 2016/0115803 | A1 * | 4/2016 | Papple | F01D 9/041 415/115 |
| 2023/0304412 | A1 * | 9/2023 | Preuss | F01D 5/189 |

OTHER PUBLICATIONS

European Search Report issued Feb. 1, 2024 in counterpart EP Application No. 23200971.2.

* cited by examiner

*Primary Examiner* — Eldon T Brockman

(74) *Attorney, Agent, or Firm* — Bachman & LaPointe, P.C.

(57) ABSTRACT

An outer platform leading edge cooling system includes a radially outer platform having a platform leading edge; a hollow cooling channel is defined extending generally longitudinally along the platform leading edge of the radially outer platform; an inlet port located in a radially outer end region of the platform leading edge being fluidly coupled with the hollow cooling channel; and the hollow cooling channel comprising an outlet conduit extending from a cooling channel exit, the outlet conduit being connected in fluid flow communication with a trailing edge cavity.

20 Claims, 4 Drawing Sheets

PLATFORM OUTSIDE DIAMETER CHANNEL FOR DUAL SUPPLY PRESSURE VANE APPLICATIONS

BACKGROUND

The present disclosure is directed to the improved vane platform cooling system, particularly an outer platform leading edge channel cooling system.

High performance gas turbine engines operate at very high temperatures, requiring elaborate cooling systems to protect the exposed turbine parts, including the turbine vane airfoils and platforms. However, since flowing coolant through the turbine diminishes overall engine performance, it is typically desirable to minimize the cooling flow consumption without degrading the turbine vane durability. Heretofore, the proposed solutions still generally demand higher than required cooling consumption which therefore limits engine performance.

High pressure turbine vanes require cooling flow bled off of the compressor in order to meet their life targets as the gas path air temperatures exceeds the capability of the constituent alloys and coatings in the gas path. In order to minimize cycle losses due to cooling flow and improve turbine efficiency, it is advantageous to use as little cooling air as possible to meet life targets.

Additionally, it is beneficial to use cooling air bled off of lower compressor stages whenever possible as the cycle penalty is lower when utilizing this air for cooling. It is fairly common for turbine vanes to have multiple cooling sources for this reason. The leading edge sees higher gas path pressures, and often requires higher pressure and more 'expensive' air from an efficiency standpoint to cool the exterior surface. Towards the trailing edge gas path pressures are lower, and cooling can be provided from a lower stage in the compressor. This makes the cooling scheme more complicated but improves efficiency.

For certain 2nd stage vane applications platforms are uncooled. In many applications, especially commercial vanes, platforms experience high leading edge platform oxidation due to the high temperatures and very low convective cooling.

Accordingly, there is a need to provide a new turbine vane cooling arrangement which addresses these and other limitations.

SUMMARY

In accordance with the present disclosure, there is provided an outer platform leading edge cooling system comprising a radially outer platform having a platform leading edge; a hollow cooling channel is defined extending generally longitudinally along the platform leading edge of the radially outer platform; an inlet port located in a radially outer end region of the platform leading edge being fluidly coupled with the hollow cooling channel; and the hollow cooling channel comprising an outlet conduit extending from a cooling channel exit, the outlet conduit being connected in fluid flow communication with a trailing edge cavity.

A further embodiment of any of the foregoing embodiments may additionally and/or alternatively include the radially outer platform includes a platform leading edge, the radially outer platform defines a band section, a leading section projecting radially outwardly from a forward end of the band section.

A further embodiment of any of the foregoing embodiments may additionally and/or alternatively include the inlet port is located in a radially outer end region of the leading section in fluid communication with the hollow cooling channel.

A further embodiment of any of the foregoing embodiments may additionally and/or alternatively include the hollow cooling channel is fluidly coupled to an inlet conduit extending radially inwardly from the inlet port to an inlet end section of the hollow cooling channel.

A further embodiment of any of the foregoing embodiments may additionally and/or alternatively include the platform leading edge of the radially outer platform is provided at a radially inner end of the leading section adjacent the radially outer end of an airfoil adjacent the radially outer platform.

A further embodiment of any of the foregoing embodiments may additionally and/or alternatively include the trailing edge cavity is formed in a radially outer surface of a band section of the radially outer platform.

A further embodiment of any of the foregoing embodiments may additionally and/or alternatively include the hollow cooling channel comprises a longitudinal cooling chamber configured to receive coolant air from the inlet port.

In accordance with the present disclosure, there is provided an outer platform leading edge cooling system comprising an outer platform having a platform leading edge, the outer platform defines a band section, a leading section projecting radially outwardly from a forward end of the band section, and a trailing section extending radially outwardly from a rearward end of the band section; the platform leading edge is provided at a radially inner end of the leading section adjacent the radially outer end of an airfoil adjacent the platform; a platform leading edge cooling channel extending generally longitudinally along the leading edge of the outer platform; an inlet port located in a radially outer end region of the leading section in fluid communication with the platform leading edge cooling channel; the platform leading edge cooling channel includes an inlet conduit extending radially inwardly from the inlet port to an inlet end section of platform leading edge cooling channel; and the platform leading edge cooling channel includes an outlet conduit extending from a cooling channel exit, the outlet conduit is connected in fluid flow communication with a trailing edge cavity formed in a radially outer surface of the band section of the outer platform.

A further embodiment of any of the foregoing embodiments may additionally and/or alternatively include the platform leading edge cooling channel comprises a longitudinal cooling chamber configured to receive coolant air from the inlet port.

A further embodiment of any of the foregoing embodiments may additionally and/or alternatively include the inlet port is disposed in fluid flow relationship with compressor bleed air.

A further embodiment of any of the foregoing embodiments may additionally and/or alternatively include the outer platform leading edge cooling system further comprising a segment of a turbine vane ring comprising an inner platform and the outer platform and the airfoil extending between the inner platform and the outer platform.

In accordance with the present disclosure, there is provided a process for cooling an outer platform leading edge with a cooling system comprising providing a radially outer platform having a platform leading edge; forming a hollow cooling channel extending generally longitudinally along the platform leading edge of the radially outer platform;

forming an inlet port in a radially outer end region of the platform leading edge; fluidly coupling the inlet port with the hollow cooling channel; and fluidly coupling an outlet conduit with a cooling channel exit of the hollow cooling channel; and connecting the outlet conduit in fluid flow communication with a trailing edge cavity.

A further embodiment of any of the foregoing embodiments may additionally and/or alternatively include the radially outer platform includes a platform leading edge, the radially outer platform defines a band section, a leading section projecting radially outwardly from a forward end of the band section.

A further embodiment of any of the foregoing embodiments may additionally and/or alternatively include the process further comprising forming the inlet port in a radially outer end region of the leading section in fluid communication with the hollow cooling channel.

A further embodiment of any of the foregoing embodiments may additionally and/or alternatively include the process further comprising fluidly coupling the hollow cooling channel to an inlet conduit extending radially inwardly from the inlet port to an inlet end section of the hollow cooling channel.

A further embodiment of any of the foregoing embodiments may additionally and/or alternatively include the process further comprising forming the platform leading edge of the radially outer platform at a radially inner end of the leading section adjacent the radially outer end of an airfoil adjacent the radially outer platform.

A further embodiment of any of the foregoing embodiments may additionally and/or alternatively include the process further comprising forming the trailing edge cavity in a radially outer surface of a band section of the radially outer platform.

A further embodiment of any of the foregoing embodiments may additionally and/or alternatively include the process further comprising disposing the inlet port in fluid flow relationship with compressor bleed air.

A further embodiment of any of the foregoing embodiments may additionally and/or alternatively include the process further comprising supplying coolant air from the inlet port to the hollow cooling channel, the hollow cooling channel comprising a longitudinal cooling chamber.

A further embodiment of any of the foregoing embodiments may additionally and/or alternatively include the process further comprising a segment of a turbine vane ring comprising an inner platform and the outer platform and the airfoil extending between the inner platform and the outer platform.

Other details of the cooling system are set forth in the following detailed description and the accompanying drawings wherein like reference numerals depict like elements.

DETAILED DESCRIPTION

Figure 1:
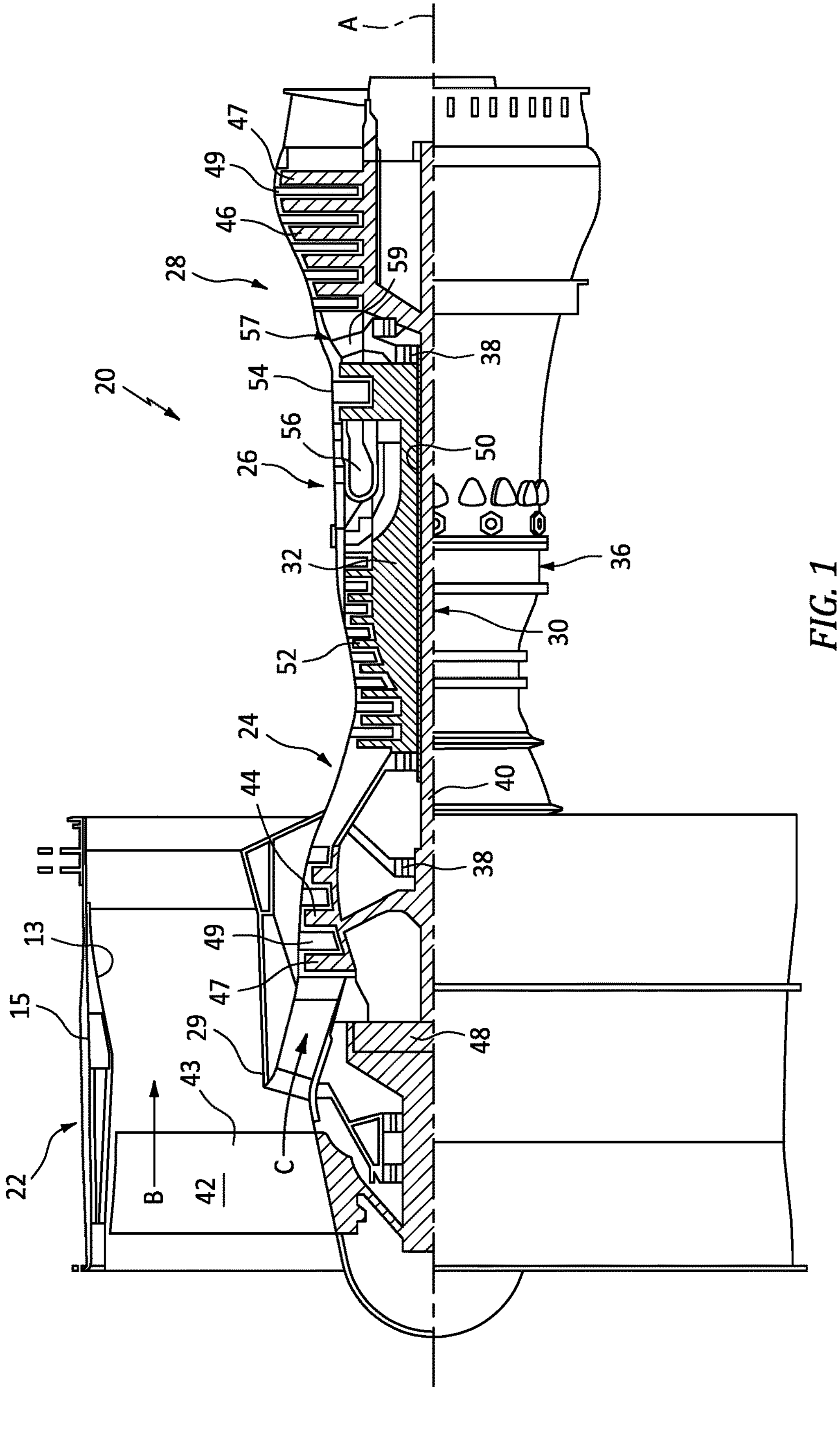
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition, typically cruise at about 0.8 Mach and about 35,000 feet (10,668 meters). The flight condition of 0.8 Mach and 35,000 ft. (10,668 meters), with the engine at its best fuel consumption—also known as "bucket cruise Thrust Specific Fuel Consumption ('TSFC')"—is the industry standard parameter of pounds mass of fuel being burned divided by pounds force of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a span wise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in feet/second divided by an industry standard temperature correction of $[(\text{Tram } ^\circ \text{ R})/(518.7^\circ \text{ R})]^{0.5}$. The "low corrected fan tip speed" can be less than or equal to 1150.0 feet/second (350.5 meters/second), and greater than or equal to 1000.0 feet/second (304.8 meters/second).

Figure 2:
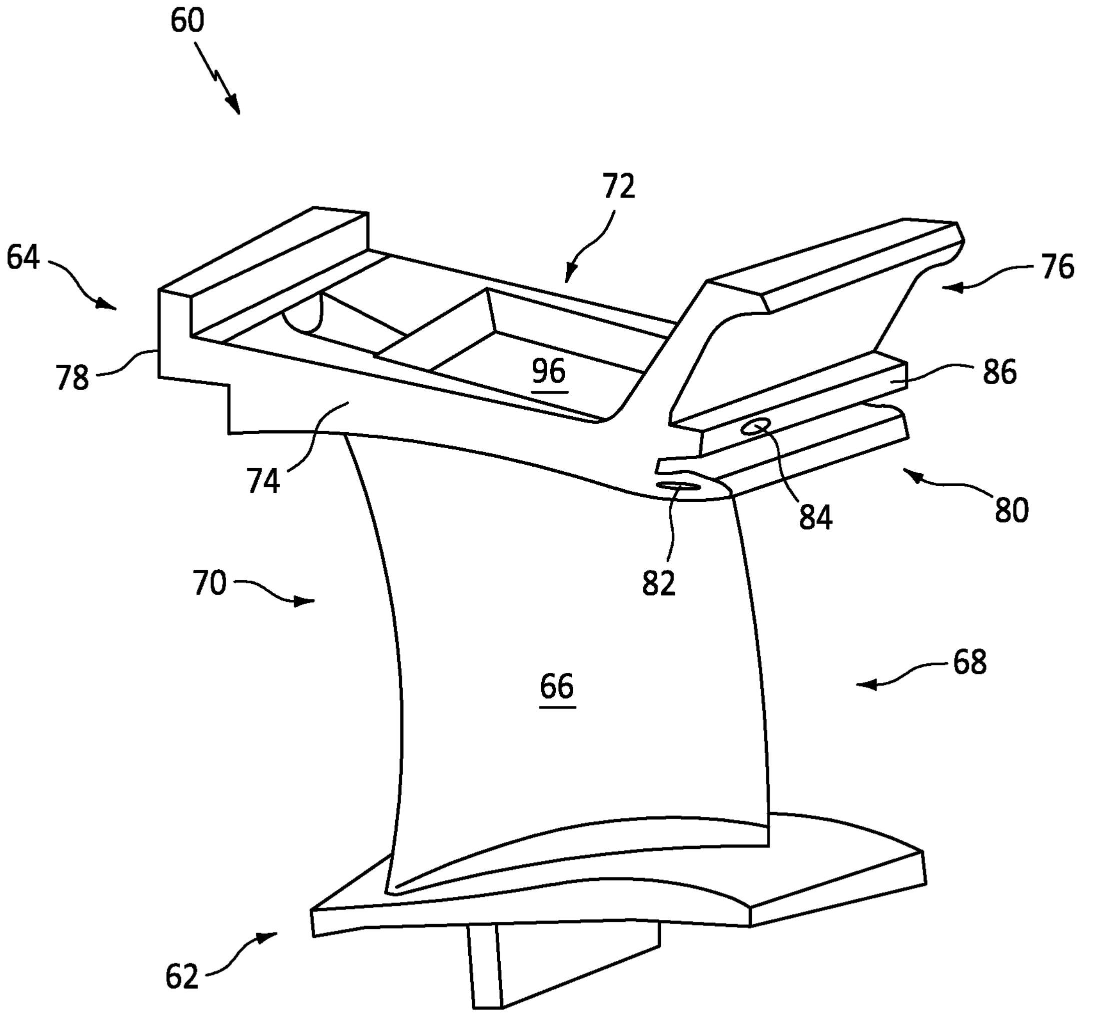
FIG. 2 is an isometric view of a turbine vane segment including at least one airfoil extending between inner and outer platforms.

FIG. 2 illustrates a segment of a turbine vane ring 60. The turbine vane ring segment 60 may comprise a radially inner platform 62 and a radially outer platform 64 and at least one airfoil 66 extending between the radially inner platform 62 and a radially outer platform 64. The platforms 62 and 64 define therebetween a section of the gas path of the gas turbine engine 20. The airfoil 66 has a leading edge 68 and a trailing edge 70. A vane trailing edge cavity 72 is formed in the radially outer platform 64.

Figure 3:
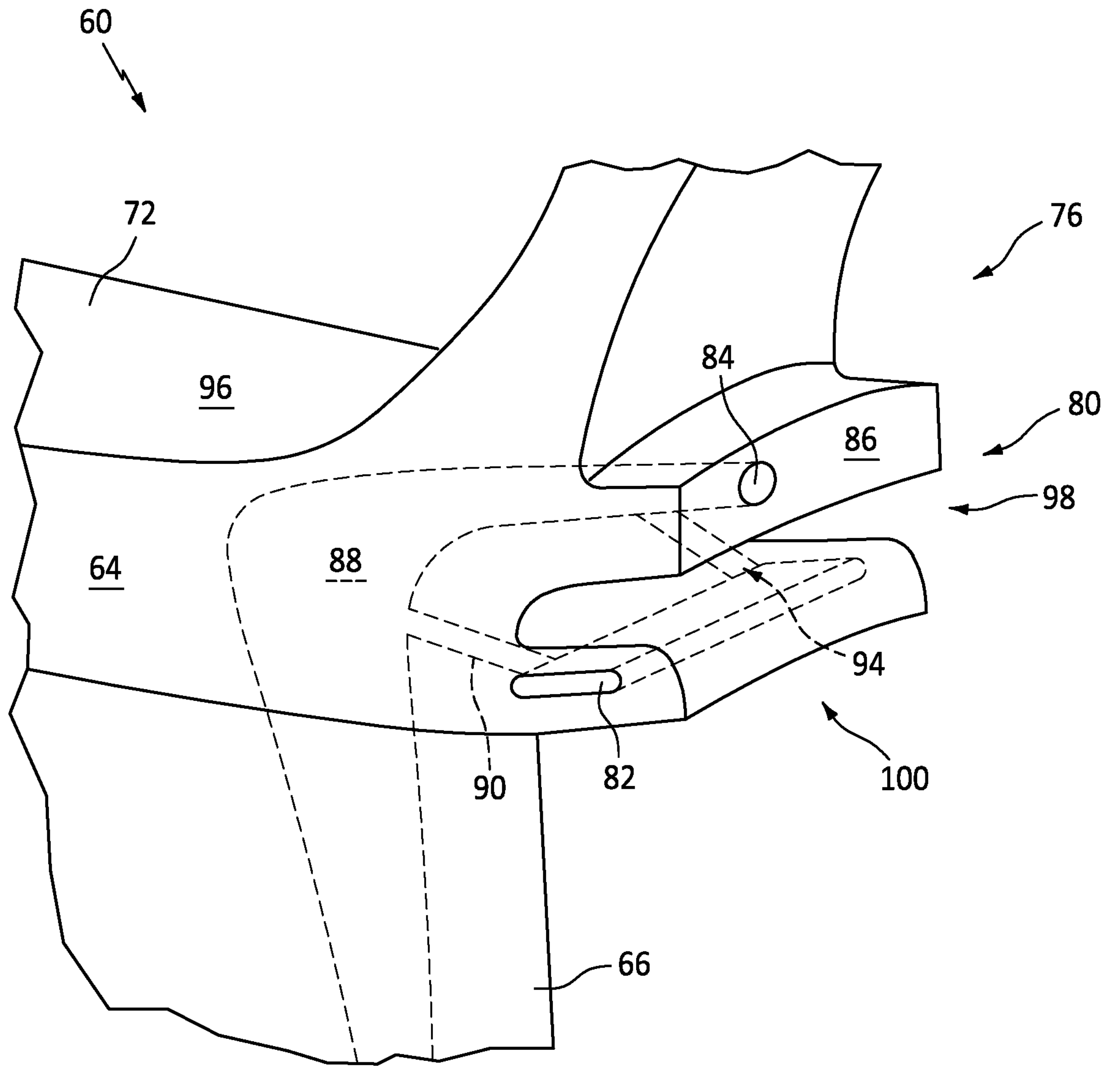
FIG. 3 is an enlarged isometric view similar to FIG. 2 but illustrating the internal position and configuration of a hollow core or cavity provided in the leading edge portion of the outer platform and an exemplary cooling system.
Figure 4:
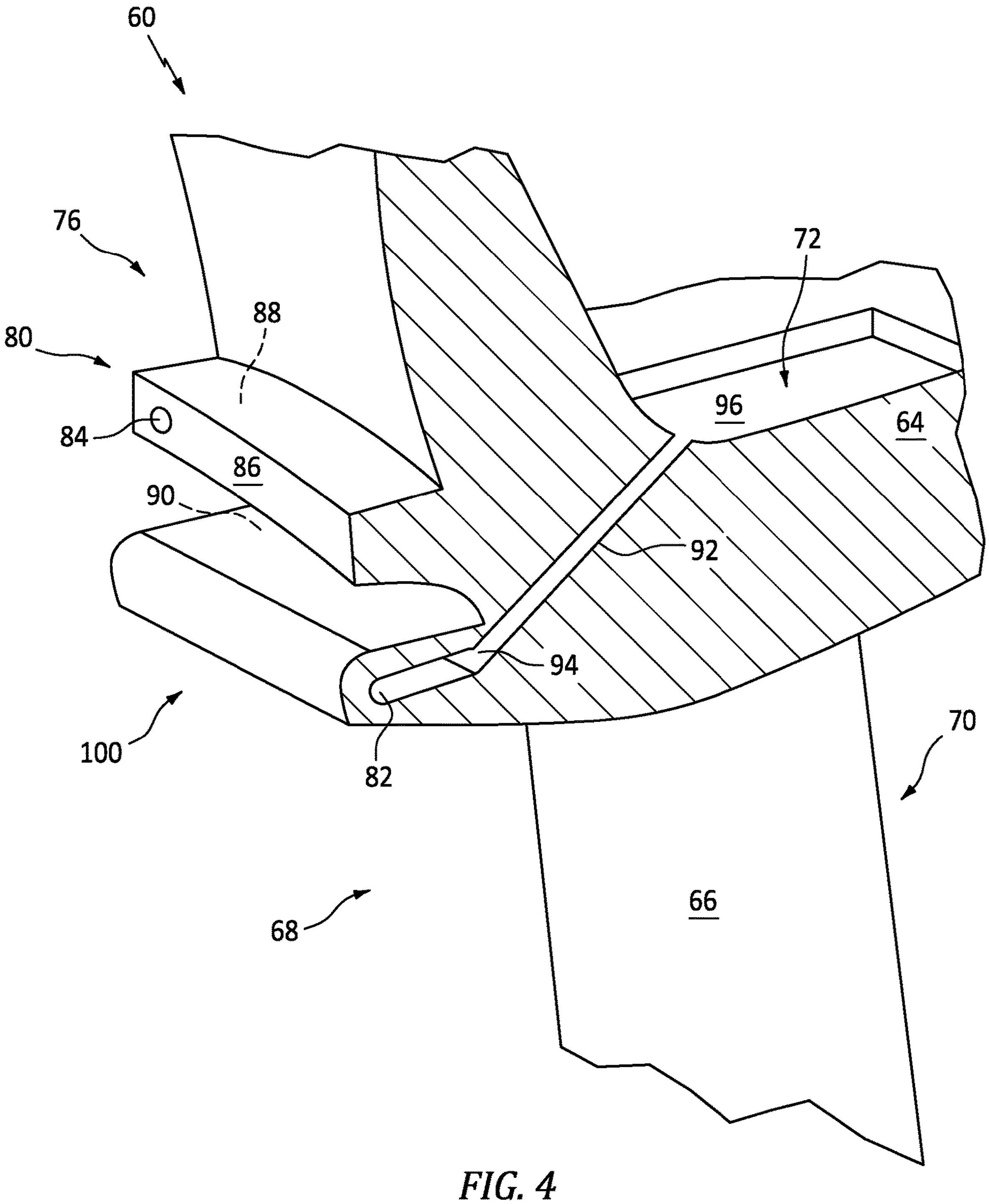
FIG. 4 is an enlarged isometric cross-sectional view similar to FIG. 3 from an opposite perspective showing the exemplary cooling system.

Referring also to FIGS. 3 and 4, it can be seen that the outer platform 64 defines a band section 74, a leading section 76 projecting radially outwardly from a forward end of the band section 74, and a trailing section 78 extending radially outwardly from a rearward end of the band section 74. A platform leading edge 80 of the outer platform 64 is provided at a radially inner end of the leading section 76 adjacent the radially outer end of the airfoil 66. The leading section 76 and particularly the leading edge 80 is subject to high temperature by the hot gases discharged from the combustor 56.

As shown in FIGS. 3 and 4, the turbine vane segment 60 may also incorporate in the leading section 76 a hollow cooling channel, particularly, a platform leading edge cooling channel 82 extending generally longitudinally along the leading edge 80 of the outer platform 64. The cooling channel 82 can be provided in the form of a longitudinal cooling chamber to receive cooling air from an inlet port 84 located in a radially outer end region 86 of the leading section 76. The inlet port 84 is disposed in fluid flow relationship with compressor bleed air or another suitable source of cooling fluid. As shown in FIG. 4, the platform leading edge cooling channel 82 has an inlet conduit 88 extending radially inwardly from the inlet port 84 to an inlet end section 90 of the cooling channel 82. The cooling channel 82 includes an outlet conduit 92 extending from a cooling channel exit 94. The outlet conduit 92 is connected in fluid flow communication with the trailing edge cavity 72 formed in a radially outer surface 96 of the band section 74 of the outer platform 64.

An outer platform leading edge cooling system 100 employs coolant air 98 brought in from a high-pressure source through the inlet port 84 to feed the hollow cooling channel 82 that cools the leading edge section 76 of the radially outer platform 64. The coolant air 98 is then fed from the hollow cooling channel 82 channel exit 94 to the outlet conduit 92 into the vane trailing edge cavity 72 (low pressure source) and re purposed for radially outer platform 64 film cooling.

A technical advantage of the disclosed cooling system includes an increase in the cooling capabilities of the cooling system while reducing cooling air consumption.

Another technical advantage of the disclosed cooling system includes a radially outer platform machined channel that increases the internal convection at the leading edge where the hardware shows high distress and poor coating options.

Another technical advantage of the disclosed cooling system includes coolant air is brought in from the high-pressure source to feed the channel that cools the platform.

Another technical advantage of the disclosed cooling system includes channel air is fed back into the vane trailing edge cavity (low pressure source) and re purposed for outer platform film cooling.

Another technical advantage of the disclosed cooling system includes a solution for historical high distress regions in dual source vanes where leading edge platform distress is prevalent.

There has been provided a cooling system. While the cooling system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An outer platform leading edge cooling system comprising:

a radially outer platform having a platform leading edge;

a hollow cooling channel is defined extending generally longitudinally along the platform leading edge of the radially outer platform;

an inlet port located in a radially outer end region of the platform leading edge being fluidly coupled with the hollow cooling channel, wherein the radially outer end region projects radially outwardly from platform leading section forming a flange adjacent the platform leading edge; and the hollow cooling channel comprising an outlet conduit extending from a cooling channel exit, the outlet conduit being connected in fluid flow communication with a trailing edge cavity.

2. The outer platform leading edge cooling system according to claim 1, wherein said radially outer platform includes a platform leading edge, the radially outer platform defines a band section, a leading section projecting radially outwardly from a forward end of the band section.

3. The outer platform leading edge cooling system according to claim 2, wherein the inlet port is located in a radially outer end region of the leading section in fluid communication with the hollow cooling channel.

4. The outer platform leading edge cooling system according to claim 2, wherein the hollow cooling channel is fluidly coupled to an inlet conduit extending radially inwardly from the inlet port to an inlet end section of the hollow cooling channel.

5. The outer platform leading edge cooling system according to claim 2, wherein the platform leading edge of the radially outer platform is provided at a radially inner end of the leading section adjacent the radially outer end of an airfoil adjacent the radially outer platform.

6. The outer platform leading edge cooling system according to claim 1, wherein the trailing edge cavity is formed in a radially outer surface of a band section of the radially outer platform.

7. The outer platform leading edge cooling system according to claim 1, wherein the hollow cooling channel comprises a longitudinal cooling chamber configured to receive coolant air from the inlet port.

8. An outer platform leading edge cooling system comprising:

an outer platform having a platform leading edge, the outer platform defines a band section, a leading section projecting radially outwardly from a forward end of the band section, and a trailing section extending radially outwardly from a rearward end of the band section;

the platform leading edge is provided at a radially inner end of the leading section adjacent the radially outer end of an airfoil adjacent the platform;

a platform leading edge cooling channel extending generally longitudinally along the leading edge of the outer platform;

an inlet port located in a radially outer end region of the leading section in fluid communication with the platform leading edge cooling channel, wherein the radially outer end region is formed as a flange projection adjacent the platform leading edge;

the platform leading edge cooling channel includes an inlet conduit extending radially inwardly from the inlet port to an inlet end section of platform leading edge cooling channel; and the platform leading edge cooling channel includes an outlet conduit extending from a cooling channel exit, the outlet conduit is connected in fluid flow communication with a trailing edge cavity formed in a radially outer surface of the band section of the outer platform.

9. The outer platform leading edge cooling system according to claim 8, wherein the platform leading edge cooling channel comprises a longitudinal cooling chamber configured to receive coolant air from the inlet port.

10. The outer platform leading edge cooling system according to claim 8, wherein the inlet port is disposed in fluid flow relationship with compressor bleed air.

11. The outer platform leading edge cooling system according to claim 8, further comprising:

a segment of a turbine vane ring comprising an inner platform and the outer platform and the airfoil extending between the inner platform and the outer platform.

12. A process for cooling an outer platform leading edge with a cooling system comprising:

providing a radially outer platform having a platform leading edge;

forming a hollow cooling channel extending generally longitudinally along the platform leading edge of the radially outer platform;

forming an inlet port in a radially outer end region of the platform leading edge, wherein the radially outer end region is formed as a flange projection adjacent the platform leading edge;

fluidly coupling the inlet port with the hollow cooling channel; and fluidly coupling an outlet conduit with a cooling channel exit of the hollow cooling channel; and connecting the outlet conduit in fluid flow communication with a trailing edge cavity.

13. The process of claim 12, wherein said radially outer platform includes a platform leading edge, the radially outer platform defines a band section, a leading section projecting radially outwardly from a forward end of the band section.

14. The process of claim 13 further comprising:

forming the inlet port in a radially outer end region of the leading section in fluid communication with the hollow cooling channel.

15. The process of claim 13, further comprising:
fluidly coupling the hollow cooling channel to an inlet conduit extending radially inwardly from the inlet port to an inlet end section of the hollow cooling channel.

16. The process of claim 13, further comprising:
forming the platform leading edge of the radially outer platform at a radially inner end of the leading section adjacent the radially outer end of an airfoil adjacent the radially outer platform.

17. The process of claim 13, further comprising:
forming the trailing edge cavity in a radially outer surface of a band section of the radially outer platform.

18. The process of claim 13, further comprising:
supplying coolant air from the inlet port to the hollow cooling channel, said hollow cooling channel comprising a longitudinal cooling chamber.

19. The process of claim 12, further comprising:
disposing the inlet port in fluid flow relationship with compressor bleed air.

20. The process of claim 12, further comprising:
a segment of a turbine vane ring comprising an inner platform and the outer platform and the airfoil extending between the inner platform and the outer platform.

* * * * *